United States Patent
Shao et al.

(10) Patent No.: US 12,489,716 B1
(45) Date of Patent: Dec. 2, 2025

(54) RESOURCE UTILIZATION FORECASTING FOR PREDICTIVE AUTOSCALING

(71) Applicant: Intuit Inc., Mountain View, CA (US)

(72) Inventors: Xiaotang Shao, Cupertino, CA (US); Hui Luo, Fremont, CA (US); Estela Ramirez Ramirez, San Jose, CA (US); Zihan Jiang, Foster City, CA (US); Sen Lin, Santa Clara, CA (US); Shreyas Badiger Mahadev, Santa Clara, CA (US); Navin Kumar Jammula, Dublin, CA (US); Yuxuan Zhu, Sunnyvale, CA (US); Chun-Che Peng, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 21 days.

(21) Appl. No.: 18/677,258

(22) Filed: May 29, 2024

(51) Int. Cl.
*H04L 47/70* (2022.01)
*H04L 47/83* (2022.01)

(52) U.S. Cl.
CPC .......... *H04L 47/826* (2013.01); *H04L 47/822* (2013.01); *H04L 47/83* (2022.05)

(58) Field of Classification Search
CPC ...... H04L 47/826; H04L 47/822; H04L 47/83
See application file for complete search history.

(56) References Cited

U.S. PATENT DOCUMENTS

| | | | |
|---|---|---|---|
| 10,484,301 B1 * | 11/2019 | Shukla | G06F 3/0605 |
| 2024/0012667 A1 * | 1/2024 | Mohanty | G06F 9/5077 |
| 2025/0103410 A1 * | 3/2025 | Mohanty | G06F 11/302 |
| 2025/0110775 A1 * | 4/2025 | Janakiraman | G06F 9/4856 |

OTHER PUBLICATIONS

Turin et al. "Predicting resource consumption of Kubernetes container systems using resource models" The Journal of Systems & Software 203 (2023) 111750, 19 pp.

Wang, Thomas. "Predictive vertical CPU autoscaling in Kubernetes based on time-series forecasting with Holt-Winters exponential smoothing and long short-term memory", Degree Programme in Computer Science and Engineering, KTH Royal Institute of Technology, School of Electrical Engineering and Computer Science, Apr. 16, 2021. 64 pp.

Wang et al. "Predicting CPU usage for proactive autoscaling" EuroMLSys '21: Proceedings of the 1st Workshop on Machine Learning and Systems, Apr. 2021. pp. 31-38.

* cited by examiner

*Primary Examiner* — Caroline H Jahnige
(74) *Attorney, Agent, or Firm* — Dinsmore & Shohl LLP

(57) ABSTRACT

Certain aspects of the disclosure provide techniques for predictive autoscaling. A method includes determining resource utilization metrics for a plurality of instances of a service running in a container-based cluster for a plurality of timestamps over a period of time; applying a smoothing filter to the resource utilization metrics to obtain smoothed resource utilization metrics; adjusting each of the smoothed resource utilization metrics by a nominal value; calculating a plurality of ratio metrics for the smoothed resource utilization metrics; processing, with a machine learning (ML) model trained to perform resource utilization forecasting, the plurality of ratio metrics and to predict a future ratio metric for the service after a prediction time window; determining a future resource utilization for the service after the prediction time window based on the future ratio metric; and automatically adjusting configuration parameter(s) to modify a state of the container-based cluster based on the future resource utilization.

20 Claims, 7 Drawing Sheets

RESOURCE UTILIZATION FORECASTING FOR PREDICTIVE AUTOSCALING

BACKGROUND

Field

Aspects of the present disclosure relate to predictive autoscaling.

Description of Related Art

In today's rapidly evolving digital landscape, cloud computing has emerged as a transformative force, revolutionizing the way users (e.g., including organizations) operate and deliver services. For example, cloud computing is a method of pooling and delivering shared, on-demand computing resources (e.g., such as networks, servers, storage, etc.) across a network. Users may leverage this pool of computing resources to provide their software application(s) as highly available web service(s) (simply referred to herein as "service(s)") in a cloud architecture (e.g., which may be accessible via the Internet) at an affordable cost. High availability may be a characteristic of a service that is capable of operating continuously without failing.

Within cloud computing architectures, the service(s) may be deployed onto one or more containers (referred to as "containerized service(s)"), where a container is a type of software used to virtually package and isolate a service for deployment. For example, a container may package a service's code and dependencies together, enabling the service to reliably run in various computing environments. In certain aspects, containers may be grouped into logical units called "pods." Containers in a same pod may share the same storage and networking resources, as well as maintain a degree of isolation from container(s) in other pod(s). A node used to run pod(s) of containers may be a physical machine or a virtual machine (VM) configured to run on a physical machine running a hypervisor.

Container orchestrator systems, such as Kubernetes®, may be used to organize and deploy containerized services in cloud computing architecture to create container-based clusters. For example, Kubernetes® software is an example open-source container orchestration platform that may automate the provisioning, deployment, scaling, and management of services in container(s) and/or pod(s). Kubernetes® may create a cluster of interconnected nodes (e.g., a "Kubernetes® cluster"), including at least one master node and one or more worker nodes. Each worker node may be running one or more services in container(s) and/or pod(s). The master node(s) may be responsible for cluster management and for providing an application programming interface (API) that may be used to configure and manage resources within the Kubernetes® cluster. For example, the master node may include one or more components responsible for scheduling resources within the cluster.

A number of nodes, pods, and/or containers allocated for running a service in a container-based cluster, such as a Kubernetes® cluster, may be based on one or more configuration parameters defined for the cluster. For example, a Kubernetes® cluster may include one or more configuration files that declare intended system infrastructure and service(s) to be deployed in the cluster. The configuration file(s) may provide configuration parameters for Kubernetes® objects (e.g., node objects, pod objects, container objects, etc.), or persistent entities, that are to be deployed in the cluster and managed via the container orchestration platform. In certain aspects, the configuration parameters may indicate a number of worker nodes to be provisioned in the Kubernetes® cluster, a number of pods to be deployed in the Kubernetes® cluster, a number of containers to be deployed in the Kubernetes® cluster, and/or a number of resources that are to be allocated to each of the node(s), pod(s), and/or container(s) for running containerized service(s). A Kubernetes® object is a "record of intent," meaning that the Kubernetes® cluster will constantly work to ensure that the object is realized in the cluster. For example, one or more components in the cluster may monitor the state of the cluster to help guarantee that a number of pods (e.g., pod objects) indicated in a configuration file to be deployed for a service, are continuously running and available in the deployment.

SUMMARY

Certain aspects provide a method of autoscaling. The method includes determining resource utilization metrics for a plurality of instances of a service running in a container-based cluster for a plurality of timestamps over a period of time; applying a smoothing filter to the resource utilization metrics to obtain smoothed resource utilization metrics; adjusting each of the smoothed resource utilization metrics by a nominal value; calculating a plurality of ratio metrics for the smoothed resource utilization metrics, wherein: each ratio metric is calculated as an a difference between a first smoothed resource utilization metric and a second smoothed resource utilization metric divided by the first smoothed resource utilization metric, the first smoothed resource utilization metric is associated with a first timestamp, the second smoothed resource utilization metric is associated with a second timestamp occurring later in time than the first timestamp, and an absolute value difference between the first timestamp and the second timestamp is equal to a prediction time window; processing, with a machine learning (ML) model trained to perform resource utilization forecasting, the plurality of ratio metrics and to predict a future ratio metric for the service after the prediction time window; determining a future resource utilization for the service after the prediction time window based on the future ratio metric; and automatically adjusting one or more configuration parameters for the container-based cluster to modify a state of the container-based cluster based on the future resource utilization determined for the service.

Another aspect provides a method of training a ML model to perform resource utilization forecasting. The method includes determining resource utilization metrics for a plurality of instances of a service running in a container-based cluster for a plurality of timestamps over a period of time; applying a smoothing filter to the resource utilization metrics to obtain smoothed resource utilization metrics; adjusting each of the smoothed resource utilization metrics by a nominal value; calculating a plurality of ratio metrics for the smoothed resource utilization metrics, wherein: each ratio metric is calculated as a difference between a first smoothed resource utilization metric and a second smoothed resource utilization metric divided by the first smoothed resource utilization metric, the first smoothed resource utilization metric is associated with a first timestamp, the second smoothed resource utilization metric is associated with a second timestamp occurring later in time than the first timestamp, and an absolute value difference between the first timestamp and the second timestamp is equal to a prediction time window; and training the ML model by, for each subset of the plurality of ratio metrics for a plurality of subsets of the plurality of ratio metrics: providing the subset of the plurality of ratio metrics to an input layer of the ML model; receiving, from the ML model, a ratio metric output based on the providing the subset of the plurality of ratio metrics; comparing the ratio metric output to a ratio metric in the plurality of ratio metrics determined after a last ratio metric in the subset of the plurality of ratio metrics; and modifying one or more parameters of the ML model based on the comparison.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
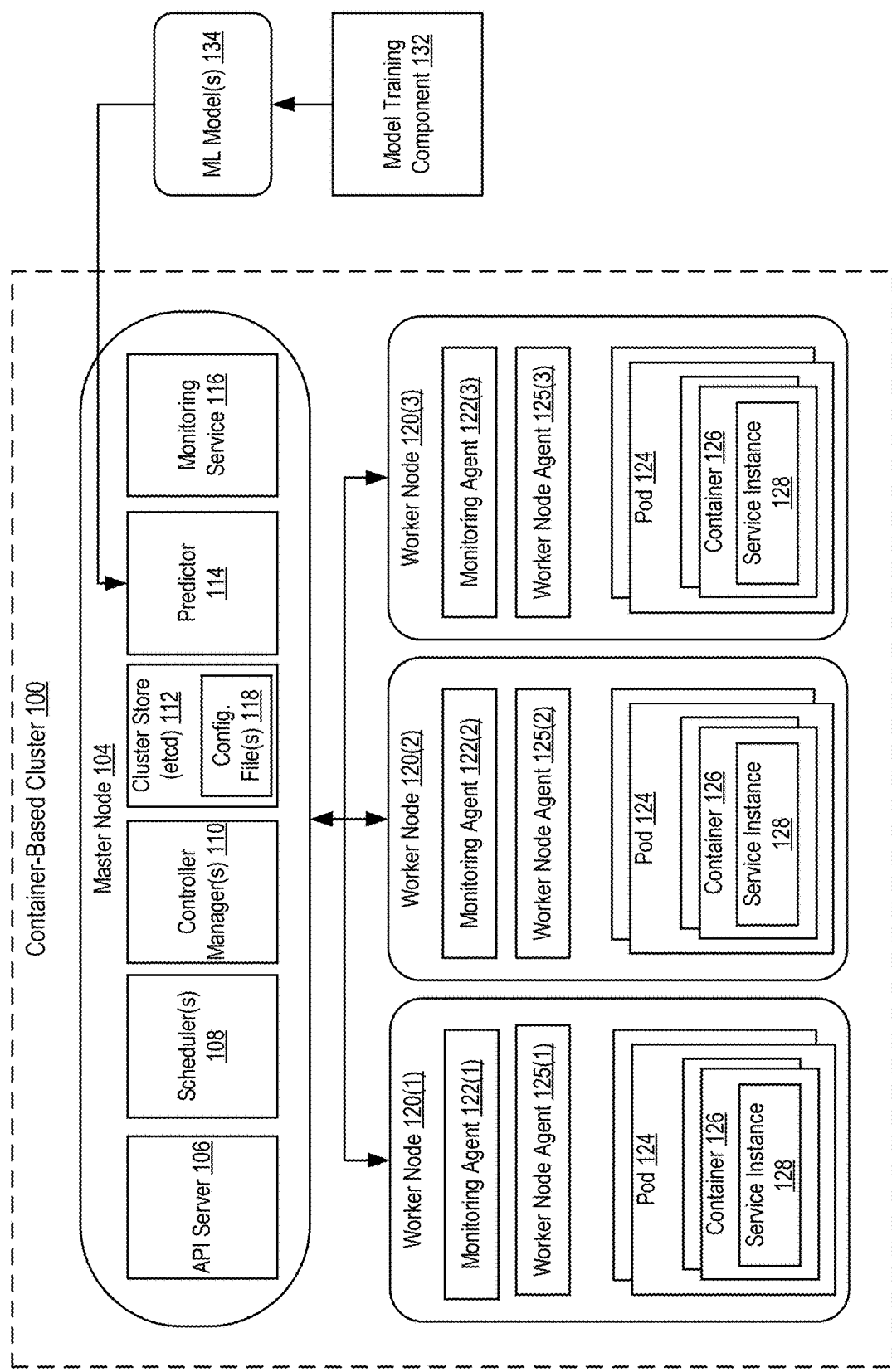
FIG. 1 depicts an example container-based cluster capable of performing predictive autoscaling according to the techniques described herein.

Over time, a number of resources (e.g., nodes, pods, containers, etc.) allocated for running a service in a container-based cluster may need to change to adapt to changing load associated with the service. For example, service load may change due to a change in a number of concurrent users accessing the service (e.g., via the Internet), a change in a number of requests needing to be processed by the service, and/or the like. To accommodate this increasing or decreasing load, resources within a Kubernetes® cluster may be scaled up or down, respectively. This scalability may have the beneficial technical effect of ensuring that operational demands and/or performance requirements associated with the service are met, even as resource demand for the service changes over time. As such, performance bottleneck(s) and/or violation(s) of one or more service level agreements (SLA(s)) defined for the service, potentiality hindering user experience with the service, may be avoided. Further, less resource waste may be realized.

Some conventional approaches may use manual provisioning techniques for scaling resources in container-based clusters to accommodate changes in service load. Manual provisioning may include monitoring resource usage of a service deployed in the cluster and manually updating configuration parameters for the cluster based on changes in load associated with the service. Updating configuration parameters for the cluster may be used to increase and/or decrease resources allocated to the service, such as increasing or decreasing a number of pods deployed in the cluster for executing the service. This approach may rely on a user manually updating one or more configuration files associated with the cluster before such load changes are realized in the cluster. Further, this approach may rely on the user accurately identifying the number of resources that need to be allocated to the service for this load change. Due to the dynamic nature of resource utilization and service load, however, such empirical and ad-hoc resource provisioning may often be inaccurate. In some cases, this inaccuracy may result in under-provisioning of resources for a service, thereby leading to performance degradation and/or service failure due to a lack of resources available to handle the service's load. In some cases, this inaccuracy may result in over-provisioning of resources for a service, thereby leading to resource underutilization and waste as well as unnecessary costs.

Some other conventional approaches have developed autoscaling tools used for automatically scaling up and/or down resources in line with current demand for a service. For example, if a service in production experiences greater load at a first time, an autoscaling tool may automatically (e.g., with little or no direct human control) increase resources allocated to the service, as necessary, to handle that change in demand. When load decreases at a second time, the autoscaling tool may automatically reduce resources allocated to the service, to thereby conserve resources.

One example autoscaling tool includes a horizontal pod autoscaler (HPA). A horizontal pod autoscaler may be configured to help achieve high availability in container-based clusters by providing automatic scaling of service-allocated resources to adapt to varying load. For example, the HPA may perform horizontal scaling, or "scaling out," which includes automatically increasing or decreasing a number of nodes, pods, and/or containers running in the container-based cluster, as opposed to increasing the capability of existing nodes/pods, and/or containers (e.g., by allocating additional resources, which is referred to as "vertical scaling"). The HPA may trigger the deployment of additional node(s), pod(s), and/or container(s) in the cluster when load for one or more services is increased. Further, the HPA may trigger the removal of node(s), pod(s), and/or container(s) in the cluster when load for one or more services is decreased. In certain aspects, the HPA triggers this change by adjusting configuration parameter(s) associated with the cluster (e.g., in one or more configuration files, as described above).

In some cases, the HPA may adjust a number of pods running instances of a single service. For example, at least two replicas of a service executing in the container-based cluster may be deployed as independent instances of the service in separate pods in the cluster to provide high availability and/or fault tolerance for the service.

The HPA may be an example of a reactive autoscaler, or a tool that scales pods in reaction to real-time changes in service load. For example, the HPA may automatically increase or decrease a number of pod replicas in a container-based cluster based on comparing current resource utilization metrics to predefined thresholds and/or metrics. As such, the HPA (e.g., a reactive autoscaler) may help to procure a responsive and efficient system by closely monitoring the resource utilization of service(s) in real-time (or near real-time) and performing immediate scaling action(s), when necessary. Further, the HPA may enable available pod capacity to more closely track current service utilization requirements.

Although reactive autoscaling provided via deployment of an HPA may provide one or more of the aforementioned benefits, this type of automatic scaling may suffer from one or more technical problems. For example, a technical problem associated with HPAs is an inability of the HPA to effectively handle sudden spikes in service load. This is because conventional HPAs are configured to wait until service load increases before scaling up computational resources, e.g., pods or pod replicas, in a container-based cluster. In other words, conventional HPAs follow the load, they do not anticipate the load. Consequently, there may be a delay, or a period of time where service load is higher, yet additional capacity (e.g., additional resources for running service instances) is not yet available in a cluster. When service load spikes, problems such as slowdowns, out of memory errors, and/or service unavailability errors may be inevitable during this period of time. As such, users may experience degraded service performance.

Alternatively, in some cases, load spikes may be short-lived. For example, a spike in service load may end before new pod(s) can be provisioned in the cluster to handle this increase in service load (e.g., pod provisioning may take approximately 5-10 minutes). As such, resources used to provision such pod(s) in the cluster may be wasted.

A large number of sudden spikes and/or drops in service load may also lead to "pod churn," which refers to a cycle through which pods are created, destroyed, and later recreated repeatedly. Pod churn may result in a waste of resources and/or power in a container-based cluster, especially in cases where spikes and drops in service load alternate over a period of time, thereby triggering a pattern of pod creation/pod removal in the cluster.

At least for the aforementioned reasons, conventional methods for resource scaling in container-based clusters, especially using HPAs, may not be effective.

Embodiments described herein overcome the technical problems of conventional approaches and improve upon the state of the art by introducing techniques for predictive autoscaling. More specifically, embodiments described herein introduce techniques for training and using a machine learning (ML) model for resource utilization forecasting, which may enable predictive autoscaling for a service running in a container-based architecture (e.g., one ML model may be associated with each service running in the container-based architecture). Predictive autoscaling may refer to the automatic and proactive (instead of reactive) scaling of resources, such as node(s) and/or pod(s) in a container-based cluster, to adapt to changes in resource utilization predicted for the service. As described herein, the predicted changes in resource utilization may be based on a future resource utilization predicted for the service using the trained ML model.

Relative changes in historical resource utilization data associated with a service (e.g., running in the container-based cluster) may be used to train the ML model to perform resource utilization forecasting for a service. For example, historical resource utilization data associated with a service may include historical resource utilization metrics for a plurality of timestamps over a period of time (e.g., such as between one and four weeks) queried for all instances (e.g., replicas) of the service, deployed and running in the cluster during the period of time. This historical resource utilization data may be processed and transformed into ratio metrics that are then used to train the ML model. Each ratio metric may represent a change in historical resource utilization for the service from a first timestamp (T1) to a second timestamp (T2) with respect to the historical resource utilization for the service at the first timestamp. For example, each ratio metric may be represented as:

$$\text{Ratio Metric} = \frac{[(\text{Resource utilization at } T2) - (\text{Resource utilization at } T1)]}{\text{Resource utilization at } T1}$$

The difference in time between the first timestamp (T1) and the second timestamp (T2) may be selected based on a forecasting period (also referred to herein as a "prediction time window") intended for the model. For example, if the ML model is expected to forecast the resource utilization of the service for a ten minute time step (e.g., predict resource utilization for the service at ten minutes in the future, twenty minutes in the future, thirty minutes in the future, etc.), then the difference between the first timestamp (T1) and the second timestamp (T2) may also be equal to ten minutes. These ratio metrics may be provided as input into the ML model to train the ML model to predict future ratio metrics for the service based on the prediction time window.

After training, the ML model may be deployed for resource utilization forecasting in the container-based cluster to predict future ratio metrics for the service. The ratio metrics predicted by the ML model may be transformed into future resource utilization predictions for the service (e.g., predictions based on the prediction time window), which may then be used to enable predictive autoscaling for the service. A future resource utilization prediction may refer to an estimate of resources that a service is expected to need at a future time to run efficiently, adequately respond to requests, operate with minimal or no issues, and/or the like.

Although aspects herein describe the use of such techniques to proactively scale resources (e.g., nodes, pods, containers, etc.) for a service running in container-based architecture, it is noted that the techniques may be similarly used in other environments where resources are capable of being automatically provisioned and/or removed.

Training and deployment of the ML model described herein provides significant technical advantages over conventional solutions for scaling resources in container-based architecture, such as an ability to more effectively handle service load spikes than conventional reactive autoscaling methods. For example, node and/or pod capacity for a service may be proactively increased when load is anticipated to increase for a service (e.g., based on the future resource utilization predictions made for the service). Thus, unlike conventional approaches, scenarios where service load exceeds available capacity in the cluster may be avoided. This may help to reduce the risk of service down-time and/or degraded performance, while also improving user experience with the service.

Further, leveraging ratio metrics, representing relative changes in resource utilization for a service, when training the ML model beneficially helps to improve the accuracy of the ML model for resource utilization forecasting. For example, relative changes in resource utilization may better represent resource utilization changes over time to more accurately predict when load spikes may occur for a service, as compared to using absolute changes in resource utilization to predict these spikes.

As an illustrative example, historical CPU usage for a service over time may include (CPU usage at T1, CPU usage at T2, . . . CPU usage at Ti). If this CPU usage is collected for a time period where activity at the service is high (e.g., if the service is a tax filing service, then activity may be high during tax season), then the CPU usage values may be high during that time period. Alternatively, if this CPU usage is collected for a time period where activity at the service is low, then the CPU usage values may be low during that time period. Absolute changes between different CPU values, at different timestamps, when the CPU usage values are high may also be high (e.g., a difference between a CPU usage of 150% at T1 and a CPU usage of 90% at T2 may be equal to 60%), while absolute changes between different CPU values, at different timestamps, when the CPU usage values are low may also be low (e.g., a difference between a CPU usage of 15% at T1 and a CPU usage of 9% at T2 may be equal to 6%). Although the absolute change in CPU for lower CPU values is low, when considered in comparison to the initial CPU usage (e.g., CPU usage of 6%), this change in CPU may be significant and actually represent a load spike for the service. For example, the 9% change in comparison to the initial value of 9% CPU usage may represent a 67% change (e.g., $$\frac{6\%}{9\%} = 67\%$$

in CPU usage (e.g., which is similar to change in CPU usage when the CPU usage values are high, e.g., $$\frac{60\%}{90\%} = 67\%.$$

At least for this reason, it may be more beneficial to use ratio metrics, representing relative changes in resource utilization for a service, when training the ML model to more accurately identify when dramatic increases (e.g., spikes) and/or decreases are expected for a service. Accordingly, the ML model may be better suited to perform resource utilization forecasting for predictive autoscaling in container-based architecture.

Further, using ratio metrics, when training the ML model, beneficially helps the ML model handle the seasonality of spikes and/or lulls in resource utilization (e.g., spikes in resource utilization for a tax application during tax season, lulls in resource utilization during holidays, etc.). For example, during ML model training, the raw resource utilization metrics may comprise resource utilization metrics associated with regular resource utilization, such as during time periods when there are no spikes and/or lulls in resource utilization (e.g., such as time periods that do not occur during tax season, holiday months, etc.). By convert-ing such resource utilization metrics to ratio metrics, the ML model may be able to better predict a high and/or low resource usage pattern, such as a peak and/or lull (e.g., holiday) resource utilization pattern.

Example Container-Based Cluster

FIG. 1 depicts an example container-based cluster 100 (also referred to herein as "cluster 100") capable of performing predictive autoscaling according to the techniques described herein. Example container-based cluster 100, shown in FIG. 1, may be a Kubernetes® cluster, a Docker® Swarm cluster, and/or another type of cluster based on container technology.

As shown, container-based cluster 100 is formed from a cluster of connected nodes, including (1) one or more worker nodes 120 that run one or more pods 124 having containers 126 and (2) at least one master node 104 having components running thereon that control cluster 100. For example, the components running on master node 104 may manage the computation, storage, and/or memory resources used to run all worker nodes 104. In FIG. 1, container-based cluster 100 includes a master node 104 and three worker nodes 120(1)-(3). In other examples, however, container-based cluster 100 may include more or less master nodes 104 and/or more or less worker nodes 120.

Master node 104 and worker nodes 120(1)-(3) may each be a physical machine, such as a host, or a VM configured to run on the host. For example, a host may be a server constructed on a server grade hardware platform (not shown). A hardware platform of a host may include components of a computing device such as processor(s) (e.g., CPUs), memory, storage, networking interface(s) (e.g., physical network interface card(s) (PNIC(s))), and/or other components.

Each host may be configured to provide a virtualization layer, also referred to as a hypervisor (not shown). A hypervisor may abstract processor, memory, storage, and networking physical resources of a hardware platform for a host into a number of virtual computing instances (VCIs) and/or VMs (not shown) on the host. One or more VMs may run concurrently on the same host. Each VM may implement a virtual hardware platform that supports the installation of a guest operating (OS) capable of executing one or more applications and/or services.

As shown in FIG. 1, each worker node 120, includes a worker node agent 125 (referred to as a "kubelet" in Kubernetes®). A worker node agent 125 is an agent that ensures that one or more pods 124 run in the worker node 120 based on configuration parameters defined for the pod(s) 124 in configuration file(s) 118 associated with container-based cluster 100. Each pod 124 may include one or more containers 126. The worker nodes 120 may be used to execute various applications and/or software processes, referred to herein as "services," using containers 126. For example, containers 126 and pods 124 may be used to run multiple service instances 128 (e.g., replicas) of a service in container-based cluster 100.

Master node 104 includes components such as, an API server 106, one or more schedulers 108, one or more controller managers 110, and a cluster store (etcd) 112. These components may be responsible for managing container-based cluster 100 and the service instances 128 running in container-based cluster 100. In certain embodiments, master node 104 further includes a predictor 114 used to enable predictive autoscaling for container-based cluster 100. In certain embodiments, master node 104 further includes a monitoring service 116, and each worker node 120 includes a monitoring agent 122. Monitoring service 116 and monitoring agents 122 may be deployed to support resource utilization monitoring at each worker node 120, which may be used to enable predictive autoscaling for container-based cluster 100. Predictor 114, monitoring service 116, and monitoring agents 122, and their use in supporting predictive autoscaling for container-based cluster 100, are described in detail below.

API server 106 on master node 104 operates as a gateway to container-based cluster 100. For example, API server 106 exposes an API that lets end users, different components of container-based cluster 100, and/or external components communicate with one another.

One or more schedulers 108 are components responsible for assigning new containers 126 and/or new pods 124 (e.g., groups of one or more containers 126) to worker nodes 104. For example, scheduler(s) 108 may be responsible for determining a "best" worker node 104 for a new container 126 and/or new pod 124 to run on.

One or more controller manager 110 are components that run and manage controller processes in container-based cluster 100. Further, controller manager(s) 110 may reconcile the desired state (e.g., also referred to as the "intended state" of container-based cluster 100 defined in configuration file(s) 118) and the current state of container-based cluster 100. For example, controller manager(s) 110 may watch the state of container-based cluster 100, and make or request changes where needed. In certain aspects, controller manager(s) 110 are responsible for adding container(s) 126 and/or pod(s) 124 to worker node(s) 104 based on a determined future resource utilization. In certain aspects, controller manager(s) 110 are responsible for removing container(s) 126 and/or pod(s) 124 from worker node(s) 104 when they are no longer needed (e.g., based on a determined future resource utilization).

Cluster store (etcd) 112 is a data store, such as a consistent and highly-available key value store, used as a backing store for data associated with container-based cluster 100. In certain embodiments, cluster store (etcd) 112 stores configuration file(s) 118. Configuration file(s) 118 may be made up of manifest(s) that described the desired state (or "intended state") of container-based cluster 100 and the objects within container-based cluster 100. For example, configuration file(s) 118 may define the configurations for the various objects in container-based cluster 100. Objects (e.g., pod objects, container objects, etc.), or persistent entities, may be created, updated and/or deleted in container-based cluster 100 based on configuration file(s) 118 to represent the state of container-based cluster 100.

Monitoring service 116, deployed on master node 104, may be configured to collect metrics data for components in container-based cluster. For example, monitoring service 116 may communicate with a monitoring agent 122 deployed on each worker node 120, in container-based cluster 100, to collect metrics and/or logs for each worker node 120 and/or components, such as pod(s) 124, container(s) 126, and/or service instance(s) 128, running on each worker node 120 in container-based cluster 100. An example monitoring service 116 may include Prometheus®, an open-source technology designed to provide monitoring and/or alerting functionality for cloud-native environments.

In certain embodiments, the metrics data collected by monitoring service 116 includes resource utilization metrics for service instances 128 running in container-based cluster 100. For example, first resource utilization metrics may be collected for service instance 128 running on worker node 120(1), second resource utilization metrics may be collected for service instance 128 running on worker node 120(2), and third resource utilization metrics may be collected for service instance 128 running on worker node 120(3). The resource utilization metrics collected for each of these service instances 128 may include memory usage, CPU usage, transactions per section (TPS), heap usage, or a busy thread percentage. For example, for Java® applications, Java® virtual machine (JVM) heap usage, where heap is an independent memory allocation that may reduce the capacity of a main memory heap. As another example, Apache Tomcat® busy thread percentage may indicate the number of threads that are currently processing requests (e.g., are busy). The resource utilization metrics collected for each of these service instances 128 may include time-series resource utilization data. For example, the resource utilization metrics collected for each service instance 128 may include resource utilization data collected for a plurality of timestamps (e.g., resource utilization data collected every two minutes for each service instance 128).

In certain embodiments, the resource utilization metrics data, collected by monitoring service 116 for a service deployed as multiple service instances 128 in container-based cluster 100, may be used by predictor 114 for determining a future resource utilization for the service. For example, predictor 114 may be configured to perform resource utilization forecasting for the service based on the resource utilization metrics associated with the service. Further, predictor 114 may be configured to use this future resource utilization predicted for the service to evaluate whether worker nodes 104, pods 124, and/or containers 126, currently deployed in container-based cluster 100 to run service instances 128 for the service, need to be scaled up or down to better align with future demands (e.g., predicted future resource utilization) of the service, or stay the same.

In certain embodiments, predictor 114 uses an ML model 134, trained to perform resource utilization forecasting, to predict a future resource utilization for the service. For example, a model training component 132 may be used to train one ML model 134 for each service running in container-based cluster 100. Each ML model 134 may be trained to predict future resource utilization for a service based on current resource utilization metrics collected for service instances 128 deployed, for the service, in cluster 100.

In certain aspects, ML model 134 is a neural hierarchical interpolation for time series (N-HiTS) model, although other ML models may be considered. In certain aspects, a loss function used to train ML model 134 is a multivariate quantile function forecaster (MQF2) distribution loss (e.g., MQF2DistributionLoss), although other loss functions may be considered.

In certain embodiments, predictor 114 may determine to adjust a number of worker nodes 120, pods 124, and/or containers 126 deployed for a service based on the future resource utilization predicted for the service. In such cases, predictor 114 may adjust one or more configuration parameters in configuration file(s) 118 (e.g., stored in cluster store (etcd) 112) to modify a state of the container-based cluster 100. Predictor 114 may adjust the configuration parameter(s) based on the future resource utilization predicted for the service. For example, if CPU usage for the service is predicted to double after a prediction time window has passed (e.g., in ten minutes) (e.g., predicted using ratio metrics, representing relative changes in resource utilization for a service), then predictor 114 may adjust the configuration parameter(s) such that a number of pods 124 deployed in container-based cluster 100 are doubled to handle the additional expected load.

As described, controller manager(s) 110 may modify a current state of container-based cluster 100 such that the current state matches an intended state of container-based cluster 100 defined in configuration file(s) 118. Thus, when configuration parameter(s) in configuration file(s) are updated by predictor 114, an intended state for container-based cluster 100 may also be updated. Controller manager(s) 110 may notice this change in intended state and work with scheduler(s) 108 to adapt a state of container-based cluster 100 to match the new intended state. For example, controller manager(s) 110 and scheduler(s) 108 may provision or remove one or more worker nodes 104, pods 124, and/or container 126 in container-based cluster 100 such that a current state of container-based cluster 100 matches the new intended state defined for container-based cluster 100 in configuration file(s) 118.

Figure 2:
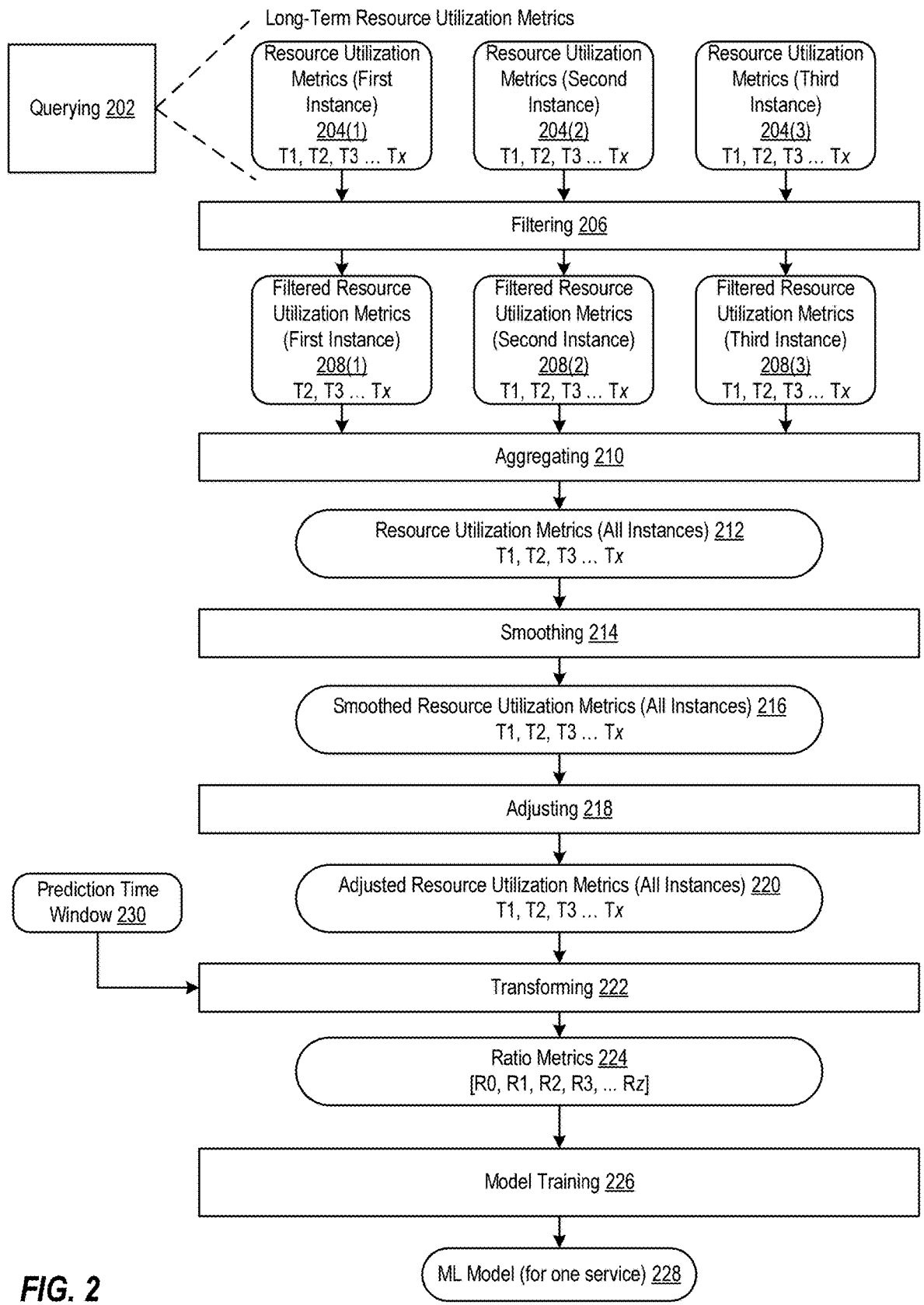
FIG. 2 depicts an example workflow for fine tuning a machine learning (ML) model for resource utilization forecasting.

Example Workflow for Fine-Tuning an ML Model for Resource Utilization Forecasting FIG. 2 depicts an example workflow 200 for fine tuning an ML model for resource utilization forecasting. For example, workflow 200 may be used to train ML model 134, in FIG. 1, to predict future resource utilization for a service running (e.g., as multiple service instances 128) in container-based cluster 100.

As shown in FIG. 2, workflow 200 includes querying 202, filtering 206, aggregating 210, smoothing 214, adjusting 218, transforming 222, and model training 226. Querying 202, filtering 206, aggregating 210, smoothing 214, adjusting 218, and transforming 222 may be used to generate training data used to train the ML model for resource utilization forecasting, according to the techniques described herein. For example, instead of training the ML model using historical resource utilization metrics queried for a service, the historical resource utilization metrics may be processed and transformed into ratio metrics, which may then be used to train the ML model. The ratio metrics may represent relative changes in historical resource utilization for the service over time. The ratio metrics for a service may be generated by performing querying 202, filtering 206, aggregating 210, smoothing 214, adjusting 218, and transforming 222 in workflow 200.

For example, workflow 200 begins with querying 202, which may include querying individual resource utilization metrics for each instance of a service running in a container-based cluster. Individual resource utilization metrics queried for a single instance may include information about resource utilization at the instance for multiple timestamps over a period of time. For the example container-based cluster 100 in FIG. 1, querying 202 may be performed by predictor 114 to obtain, from monitoring service 116, first resource utilization metrics for a service instance 128 running on worker node 120(1), second resource utilization metrics for a service instance 128 running on worker node 120(2), and third resource utilization metrics for a service instance 128 running on worker node 120(3). Each of these service instances may be replicas of a service running in container-based cluster 100.

The example in FIG. 2 also illustrates three sets of resource utilization metrics 204(1), 204(2), 204(3) obtained for three instances of a service (e.g., all instances of the same service) running in a container-based cluster (not shown). Resource utilization metrics 204(1) may indicate resource usage at a first instance for multiple timestamps between and including a first time, T1, and an xth time, Tx. For example, resource utilization metrics 204(1) may indicate resource usage at a first instance for every two minutes over the past seven days. Specifically, resource utilization metrics 204(1) may include data points indicating (1) resource usage at the first instance at 12:00 am on the first day, (2) resource usage at the first instance at 12:02 am on the first day, (3) resource usage at the first instance at 12:04 am on the first day, and etc., though 12:00 pm on the seventh day. Resource utilization metrics 204(2) and resource utilization metrics 204(3) may similarly indicate resource usage at a second instance and a third instance, respectively, for the same timestamps between and including the first time, T1, and the xth time, Tx.

Although FIG. 2 illustrates querying resource utilization metrics for only three instances of a service, in other example, more of less instances of the service may be deployed in the container-based cluster; thus, more or less individual resource utilization metrics may be queried for the service.

Workflow 200 then proceeds to filtering 206, where one or more data points, associated with one or more of the three instances, may be discarded. For example, a data point obtained for an instance and indicating a resource usage at a particular timestamp for the instance may be discarded if one or more conditions are met for the instance at that particular timestamp. The condition(s) may include the instance being in an unready state for serving traffic at the particular timestamp and/or the instance being in an error state at the particular timestamp, among others. In certain aspects, the condition(s) may include the instance being too young (e.g., <two minutes) during the start-up/warm-up time. For example, this instance may not accurately represent the resource utilization, and thus, may be discarded during filtering 206.

For example, in FIG. 2, filtering 206 may include discarding a data point obtained for the first instance indicating a resource usage of the first instance at time, T1. Specifically, at time T1, the first instance may have been in an error state and thus been unable to serve users using the service associated with the first instance. Accordingly, because the first instance was in an error state at time T1, resource utilization metrics 204(1) may be filtered, during filtering 206, to remove at least the data point having a timestamp associated with T1. Data points associated with the first instance and which remain after performing filtering 206 include filtered resource utilization metrics 208(1). As shown, filtered resource utilization metrics 208(1) does not include a data point indicating a resource usage of the first instance at time T1. Similar filtering may be applied to resource utilization metrics 204(2) associated with the second instance and resource utilization metrics 204(3) associated with the third instance to generate filtered resource utilization metrics 208(2) and filtered resource utilization metrics 208(3), respectively. Filtering the resource utilization metrics 204 may help to remove data points that do not reflect the "real" resource usage of an instance due to the instance being in an error state or being in an unready state. Further, filtering the resource utilization metrics 204 may help to reduce an amount of resource utilization metrics that need to be processed in workflow 200 (specifically during aggregating 210), thereby reducing an amount of resource and/or processing power needed for preparing training data used to train the ML model for resource utilization forecasting.

Workflow 200 then proceeds with aggregating 210, where data points obtained for the service and associated with a same timestamp are added together. Aggregating 210 may be performed to determine a total resource usage of the service (e.g., across the three instances of the service) at each timestamp. For example, filtered resource utilization metrics 208(1), 208(2), and 208(3) may all include a data point indicating a resource usage of the respective instance at time, T2. Aggregating 210 may include summing each of these data points, associated with time T2, to understand a total resource usage of the service at time T2. Similar aggregation may be done for other timestamps between, and in some cases including, time T1 and time Tx. Accordingly, after aggregating 210, resource utilization metrics 212 indicating total resource usage for the service (e.g., across all instances of the service) at different timestamps between time T1 and time Tx may be obtained.

After aggregating 210, workflow 200 proceeds with smoothing 214. Smoothing 214 may include applying a smoothing filter to resource utilization metrics 212 to obtain smoothed resource utilization metrics 216. In certain aspects, applying the smoothing filter is used to trim noisy data point(s) in resource utilization metrics 212. For example, the resource utilization metrics 212 may be noisy/spiky; thus, the smoothing filter may help to reduce (e.g., in some cases, greatly reduce) the signal-to-noise ratio (SNR). After smoothing, the resource utilization metrics may comprise better quality data for training the ML model, which may lead to better prediction performance by the ML model. In certain aspects, a Savitzky-Golay filter is used to perform smoothing 214. A Savitzky-Golay filter beneficially helps to preserve high frequency components. In certain aspects, a Wiener filter or a Kaman filter is used to perform smoothing 214.

Workflow 200 then proceeds with adjusting 218, where each data point in smoothed resource utilization metrics 216 is adjusted by a nominal value to create adjusted resource utilization metrics 220. The nominal value may be a positive integer such that all data points in smoothed resource utilization metrics 216 are adjusted to be greater than zero. For example, a data point associated with time T1 in smoothed resource utilization metrics 216 may indicate that a resource usage of the service at time T1 was equal to zero. Adjusting 218 may be performed to adjust this data point by a nominal value (e.g., such as 1 or any value between, and including, 0-1), thereby indicating that the service had a nominal amount (e.g., such as 1 or any value between, and including, 0-1) of resource usage at time T1. For example, a data point may indicate that resource utilization at time As such, adjusting 218 may be performed such that none of the data points in adjusted resource utilization metrics 220 are equal to zero. As described below, ratio metrics 224 may be calculate using the adjusted resource utilization metrics 220. A ratio metric 224 may be calculated as a change in resource utilization between a first resource utilization metric and a second resource utilization metric with respect to the first resource utilization (e.g., the first resource utilization metric is associated with a timestamp that occurs earlier in time than a timestamp associated with the second resource utilization metric). In other words, the ratio metric 224 may be calculated by dividing the change in resource utilization by the first resource utilization. In mathematics, the result of a division by zero (e.g., division where the divisor/denominator is zero) is undefined. Thus, to avoid this issue when calculating ratio metrics 224, each resource utilization metric may be adjusted by a nominal value.

After adjusting 218, workflow 200 proceeds with transforming 222. Transforming 222 may include transforming adjusted resource utilization metrics 220 into ratio metrics 224. For example, ratio metrics 224 may be calculated as a difference between a second smoothed resource utilization metric and a first smoothed resource utilization metric divided by the first smoothed resource utilization metric. For example, each ratio metric 224 may be represented as (similar to the equation provided above):

$$\text{Ratio Metric} = \frac{[(\text{2nd Smoothed Resource Util. Metric}) - (\text{1st Smoothed Resource Util. Metric})]}{\text{1st Smoothed Resource Util. Metric}}$$

The first smoothed resource utilization metric may be associated with a first timestamp. The second smoothed resource utilization metric may be associated with a second timestamp. The second timestamp may be later in time than the first timestamp. Further, an absolute value difference between the first timestamp and the second timestamp may be equal to a prediction time window 230. Prediction time window 230 may represent a time period in the future that the ML model is intended to be able to make predictions for. For example, prediction time window 230 may be equal to fourteen minutes to train the ML model to predict future resource utilization for a service every fourteen minutes in the future (e.g., a forecasted resource utilization of the service).

For example, adjusted resource utilization metrics 220 may include data points indicating a resource usage of the service for timestamps associated with two minute time intervals. In other words, adjusted resource utilization metrics 220 may include a data point (D0) for 12:00 am, a data point (D1) for 12:02 am, a data point (D2) for 12:04 am, a data point (D3) for 12:06 am (D3), a data point (D4) for 12:08 am, a data point (D5) for 12:10 am, a data point (D6) for 12:12 am, a data point (D7) for 12:14 am, a data point (D8) for 12:16 am, and so forth (e.g., adjusted resource utilization metrics 220 may include data points [DO, D1, D2, D3, D4, D5, D6, D7, D8 . . . ]). If workflow 200 is intended to train the ML model to predict a resource usage of a service for every fourteen minutes in the future, then every pair of data points in adjusted resource utilization metrics 220 associated with timestamps that are fourteen minutes apart may be used to calculate a single ratio metric. For example, one ratio metric 224 may be calculated between data point (D0) indicating a resource usage of the service at 12:00 am and data point (D7) indicating a resource usage of the service at 12:14 am (e.g., 12:14 am-12:00 am=14 minute difference). The ratio metric 224 may be calculated as:

$$\text{Ratio Metric} = \frac{(D7 - D0)}{D0}$$

This ratio metric 224 may represent an change in historical resource usage of the service between 12:00 am and 12:14 am with respect to the historical resource utilization for the service at 12:00 am.

Similar steps may be used to calculate other ratio metrics 224 from adjusted resource utilization metrics 220 based on prediction time window 230. After transforming 222, ratio metrics 224 may include [R0, R1, R2, R3, . . . . Rz].

Workflow 200 then proceeds with model training 226. Model training 226 may include training the ML model using ratio metrics 224. In certain aspects, model training 226 may include training the ML model using different subsets of the ratio metrics 224. A subset of the ratio metrics 224 (e.g., [R0, R1, R2, R3, . . . . R50] may be provided to an input layer of the ML model. Based on this subset of ratio metrics 224, the ML model may generate a predicted ratio metric (e.g., R51). The predicted ratio metric may be compared to a ratio metric in ratio metrics 224 determined after a last ratio metric in the subset provided as input into the model (e.g., R51 may be compared to R51 in ratio metrics 224). One or more parameters of the ML model may be modified based on this comparison. Similar steps may be repeated for multiple subsets of ratio metrics 224 to train the ML model to predict ratio metrics for the prediction time window 230.

Model training 226 results in creating a trained ML model 228 for the service. For example, ML model 228 may be deployed in a container-based cluster where the service is running to predict future resource usage of the service. The predicted future resource usage of the service may be used to automatically and proactively adjust resource(s) (e.g., pod(s), node(s), and/or container(s)) used for executing the service in the cluster. This type of proactive adjustment may help to ensure that the resources needed to run different loads for the service are provisioned in the cluster when needed to avoid performance degradation at the service and/or avoid hindering user experiences with the service. This type of proactive adjustment may also help to reduce resources allocated for running the service when such resources are not needed, thus avoiding resource waste in the container-based cluster.

Figure 3A:
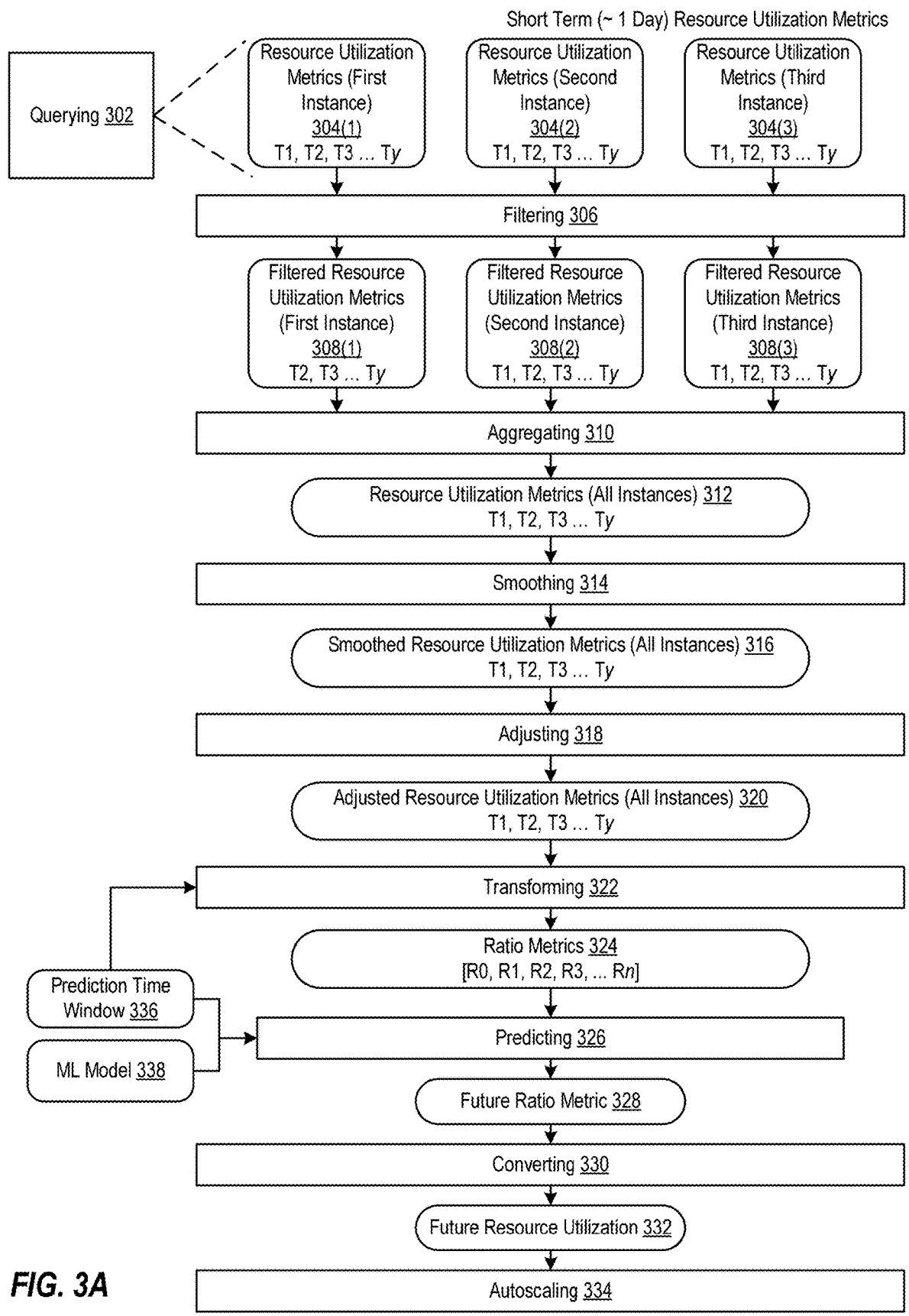
FIG. 3A depicts an example workflow for predictive autoscaling using resource utilization forecasting.

Example Workflow for Predictive Autoscaling Using Resource Utilization Forecasting FIG. 3A depicts an example workflow 300 for predictive autoscaling using resource utilization forecasting. For example, workflow 300 may be used to (1) predict future resource usage of a service running (e.g., as multiple service instances 128) in container-based cluster 100 in FIGS. 1, and (2) automatically adjust resource(s) allocated to the service (e.g., automatically adjust a number of worker nodes 120, pods 124, and/or containers 126 used to execute the service in container-based cluster 100) based on this predicted future resource usage, as needed. In other words, workflow 300 may be used to predict future resource utilization for a service to enable predictive autoscaling of resources for the service.

As shown in FIG. 3A, workflow 300 includes querying 302, filtering 306, aggregating 310, smoothing 314, adjusting 318, transforming 322, predicting 326, converting 330, and autoscaling 334. Querying 302, filtering 306, aggregating 310, smoothing 314, adjusting 318, and transforming 322 may be used to obtain resource utilization metrics for a service (e.g., short term resource utilization metrics, such as resource utilization metrics for the service for the past 24 hours), as well as process and transform these resource utilization metrics into ratio metrics. The ratio metrics may represent relative changes in resource utilization for the service over a more recent period of time. The ratio metrics may be used as input into a trained ML model 338 to determine a future resource utilization for the service after a prediction time window.

Querying 302, filtering 306, aggregating 310, smoothing 314, adjusting 318, transforming 322 in workflow 300 may be similar to querying 202, filtering 206, aggregating 210, smoothing 214, adjusting 218, and transforming 222 in FIG. 2. However, instead of performing such steps for long term resource utilization metrics obtained for a service (e.g., resource utilization metrics over multiple weeks) as done in workflow 200, in workflow 300 these steps are performed for short term resource utilization metrics obtained for the service to generate ratio metrics 324.

For example, in workflow 300, querying 302 is used to query individual resource utilization metrics for each instance of a service running in a container-based cluster. For example, query 302 may be used to obtain resource utilization metrics 304(1), 304(2), and 304(3) shown in FIG. 3A. Resource utilization metrics 304(1) may include multiple data points indicating a resource usage of a first instance of the service. The data points may be associated with a plurality of timestamps over a shorter period of time (e.g., over approximately one day or the past 24 hours). Resource utilization metrics 304(2) may include multiple data points indicating a resource usage of a second instance of the service, while resource utilization metrics 304(3) may include multiple data points indicating a resource usage of a third instance of the service. The data points in both resource utilization metrics 304(2) and resource utilization metrics 304(3) may be associated with the same plurality of timestamps over the shorter period of time as the data points included in resource utilization metrics 304(1).

Filtering 306 may include filtering resource utilization metrics 304(1), 304(2), and 304(3) to create filtered resource utilization metrics 308(1), 308(2), and 308(3), respectively. Aggregating 310 may include determining a total resource usage of the service (e.g., across the three instances of the service) at each timestamp, and thus creating resource utilization metrics 312. Smoothing 314 may include applying a smoothing filter to resource utilization metrics 312 to obtain smoothed resource utilization metrics 316. Adjusting 318 may include adjusting each data each data point in smoothed resource utilization metrics 316 by a nominal value to create adjusted resource utilization metrics 320. Transforming 322 may include transforming adjusted resource utilization metrics 220 into ratio metrics 324 (e.g., [R0, R1, R2, R3, . . . . Rn]. Ratio metric, Rn, may be the most current ratio metric calculated for the service.

Unlike workflow 200 where ratio metrics 224 are used to train an ML model to perform resource utilization forecasting, in workflow 300, the ratio metrics 324 are used as input into a trained ML model 338. For example, workflow 300 proceeds with predicting 326, which includes ML model 338 processing ratio metrics 324 to predict a future ratio metric 328 for the service after a prediction time window 336. The prediction time window 336 may be a time window that ML model 338 was trained to predict (e.g., according to the training depicted and described with respect to FIG. 2). Converting 330 is then used to convert this future ratio metric 328 to a future resource utilization 332 predicted for the service after the prediction time window 336.

For example, ML model 338 may be trained to predict a resource utilization of a service fourteen minutes in the future (e.g., prediction time window=14 minutes). Accordingly, when ML model 338 processes ratio metrics 324 (e.g., [R0, R1, R2, R3, . . . . Rn], ML model 338 may predict a future ratio metric 328 for the service, associated with a time that is fourteen minutes in the future. This future ratio metric 328 may then be used to determine future resource utilization 332 for the service fourteen minutes in the future. For example, future resource utilization 332 may be calculated as:

Future Resource Utilization=(Future ratio metric)*(Base Resource Utilization)+(Base Resource Utilizaiton)

where the base resource utilization represents the resource utilization used to determine a current ratio metric, Rn, and more specifically, a resource utilization that occurred the prediction time window (e.g., 14 minutes) in the past and that was used to calculate a current ratio metric, Rn.

As an illustrative example, a current ratio metric, Rn, calculated for the service may be equal to 10. For example, $$\text{Current Ratio Metric}(Rn) = 10 = \frac{66\% - 6\%}{6\%},$$

where 66% represents the current CPU utilization of the service and 6% represents the CPU utilization of the service 14 minutes prior, also referred to herein as the "Base Resource Utilization". A future ratio metric 328, predicted using ML model 338, may be equal to 8. As such, future resource utilization 332 may be calculated as:

Future Resource Utilization=(8)*(6%)+6%

Future Resource Utilization=54% CPU usage

In other words, ML model 338 predicts that, fourteen minutes in the future, the future ratio metric will be 8, which is less than the current ratio metric, Rn, of 10 (e.g., 8<10). Thus, the future resource utilization, 54% CPU usage, is also less than the current CPU usage, 66%. Accordingly, this prediction may allow for the scaling down of resources prior to the resource utilization reaching 54% CPU utilization (e.g., fourteen minutes in the future).

As another illustrative example, a future ratio metric 328, predicted using ML model 338, may be equal to 15. As such, future resource utilization 332 may be calculated as:

Future Resource Utilization=(15)*(6%)+6%

Future Resource Utilization=96% CPU usage

In other words, ML model 338 predicts that, fourteen minutes in the future, the future ratio metric will be 15, which is greater than the current ratio metric, Rn, of 10 (e.g., 15>10). Thus, the future resource utilization, 96% CPU usage, is also greater than the current CPU usage, 66%. Accordingly, this prediction may allow for the scaling up of resources prior to the resource utilization reaching 96% CPU utilization (e.g., fourteen minutes in the future).

Workflow 300 then proceeds with autoscaling 334. Autoscaling 334 may include automatically adjusting one or more configuration parameters for the container-based cluster, where the service is running, to modify a state of the cluster based on future resource utilization 332. For example, autoscaling 334 may include evaluating whether worker nodes 104, pods 124, and/or containers 126, currently deployed for the service, need to be scaled up or down to better align with future demands (e.g., predicted future resource utilization 332) of the service, or stay the same. In certain aspects, this evaluation may be performed by comparing the future resource utilization 332 to a threshold. If future resource utilization 332 satisfies the threshold, then configuration parameter(s) for the container-based cluster may be adjusted to scale up or down resources deployed for the service. As described herein, adjusting configuration parameter(s) for the cluster may alter an intended state for the cluster. To realize this new intended state, components deployed on a master node in the cluster may be used to provision new resources and/or removed resource previously deployed in the cluster.

Figure 3B:
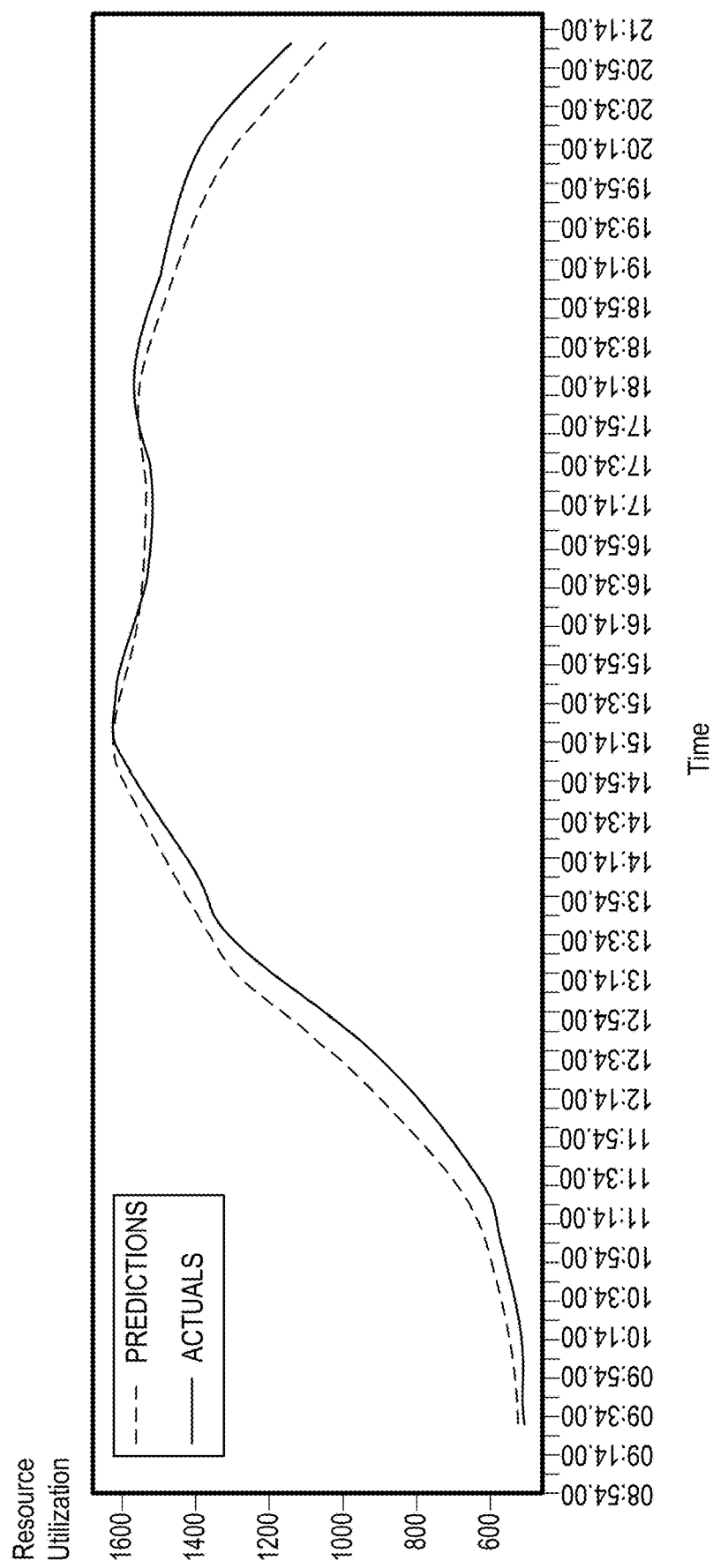
FIG. 3B depicts example resource utilization predictive performance using the workflow illustrated in FIG. 3A.

FIG. 3B depicts example resource utilization predictive performance using workflow 300 illustrated in FIG. 3A. For example, FIG. 3B compares the predicted resource utilization and the actual resource utilization for every ten minutes over approximately thirteen hours (e.g., twelve hours and twenty minutes). As shown, the predicted resource utilization is predicted a few minutes ahead of the actual resource utilization; thus, using the predicted resource utilization (e.g., determined used workflow 300) may allow for proactive scaling of resources (e.g., scaling up and/or down).

Example Method for Predictive Autoscaling

Figure 4:
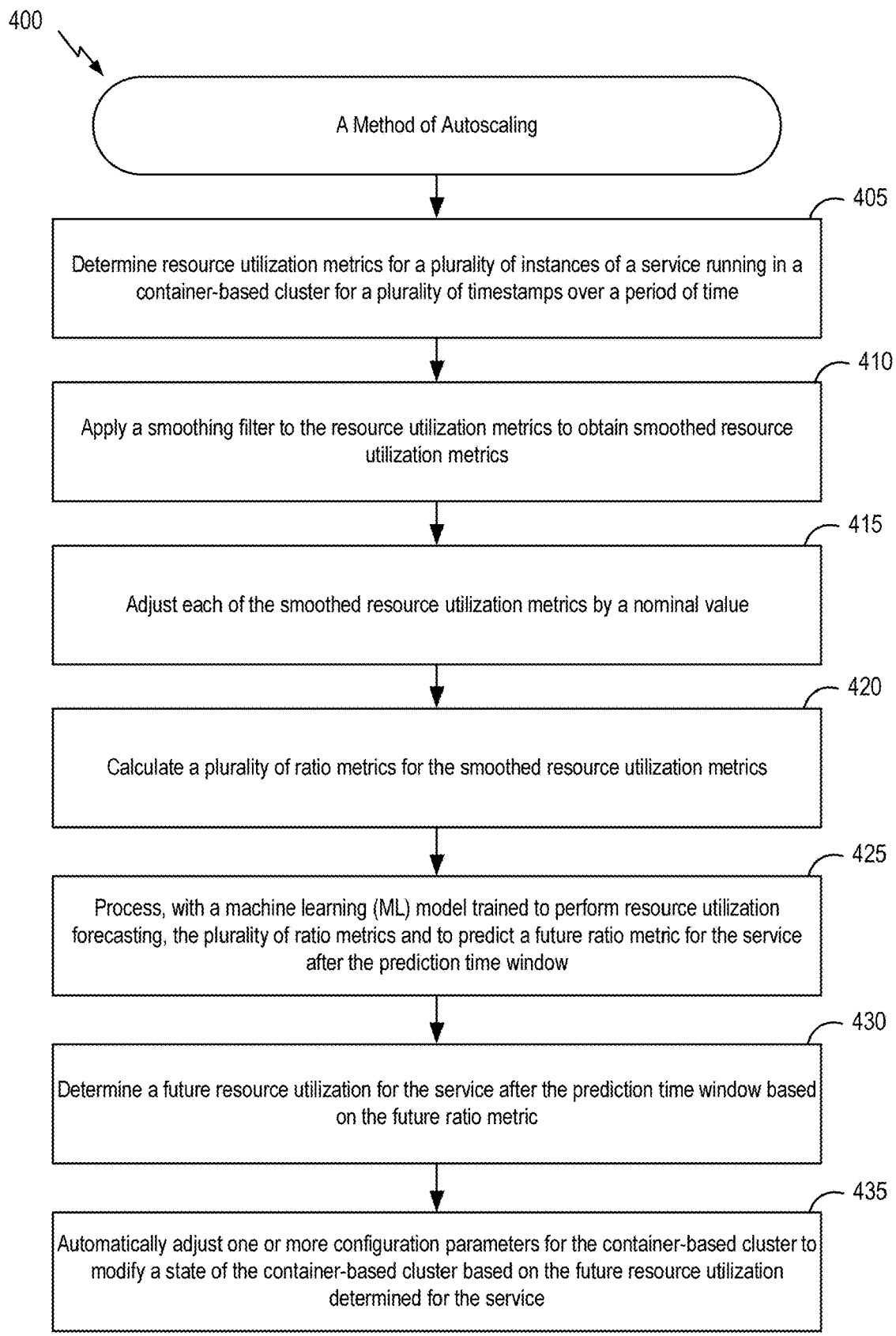
FIG. 4 depicts an example method of predictive autoscaling.

FIG. 4 depicts an example method 400 for predictive autoscaling. Method 400 may be performed by one or more processor(s) of a computing device, such as processor(s) 602 of processing system 600 described below with respect to FIG. 6.

Method 400 begins at block 405 with determining resource utilization metrics for a plurality of instances of a service running in a container-based cluster for a plurality of timestamps over a period of time.

Method 400 then proceeds to block 410 with applying a smoothing filter to the resource utilization metrics to obtain smoothed resource utilization metrics.

Method 400 then proceeds to block 415 with adjusting each of the smoothed resource utilization metrics by a nominal value. Adjusting each of the smoothed resource utilization metrics may help to ensure that the smoothed resource utilization metrics are all greater than zero such that a plurality of ratio metrics may be calculated at block 420.

Method 400 then proceeds to block 420 with calculating a plurality of ratio metrics for the smoothed resource utilization metrics. Each ratio metric may be calculated as a difference between a first smoothed resource utilization metric and a second smoothed resource utilization metric divided by the first smoothed resource utilization metric (e.g., per the equations provided herein). The first smoothed resource utilization metric may be associated with a first timestamp. The second smoothed resource utilization metric may be associated with a second timestamp occurring later in time than the first timestamp. An absolute value difference between the first timestamp and the second timestamp may be equal to a prediction time window.

Method 400 then proceeds to block 425 with processing, with a ML model trained to perform resource utilization forecasting, the plurality of ratio metrics and to predict a future ratio metric for the service after the prediction time window.

Method 400 then proceeds to block 430 with determining a future resource utilization for the service after the prediction time window based on the future ratio metric.

Method 400 then proceeds to block 435 with automatically adjusting one or more configuration parameters for the container-based cluster to modify a state of the container-based cluster based on the future resource utilization determined for the service.

In certain aspects, block 435 includes adjusting at least one of: a number of pods to be deployed in the container-based cluster; or a number of nodes to be deployed in the container-based cluster.

In certain aspects, block 435 includes automatically adjusting the one or more configuration parameters based on the future resource utilization being above or below a threshold.

In certain aspects, block 405 includes: querying individual resource utilization metrics for each instance of the plurality of instances of the service for the plurality of timestamps over the period of time; for one or more of the plurality of instances: discarding one or more of the individual resource utilization metrics associated with the instance based on a state of the instance satisfying one or more conditions; and for each timestamp of the plurality of timestamps: summing the individual resource utilization metrics for each instance associated with the timestamp to determine the resource utilization metric for the service at the timestamp.

In certain aspects, the one or more conditions comprise: the instance being in an unready state for serving traffic; or the instance being in an error state.

In certain aspects, the smoothing filter comprises a Savitzky-Golay filter, a Wiener filter, or a Kalman filter.

In certain aspects, the resource utilization metrics comprise at least one of: memory usage; CPU usage; TPS; heap usage; or a busy thread percentage.

In certain aspects, the container-based cluster comprises: a plurality of nodes; and a plurality of pods running on the plurality of nodes, and each pod comprises one or more containers running one or more of the plurality of instances.

Figure 6:
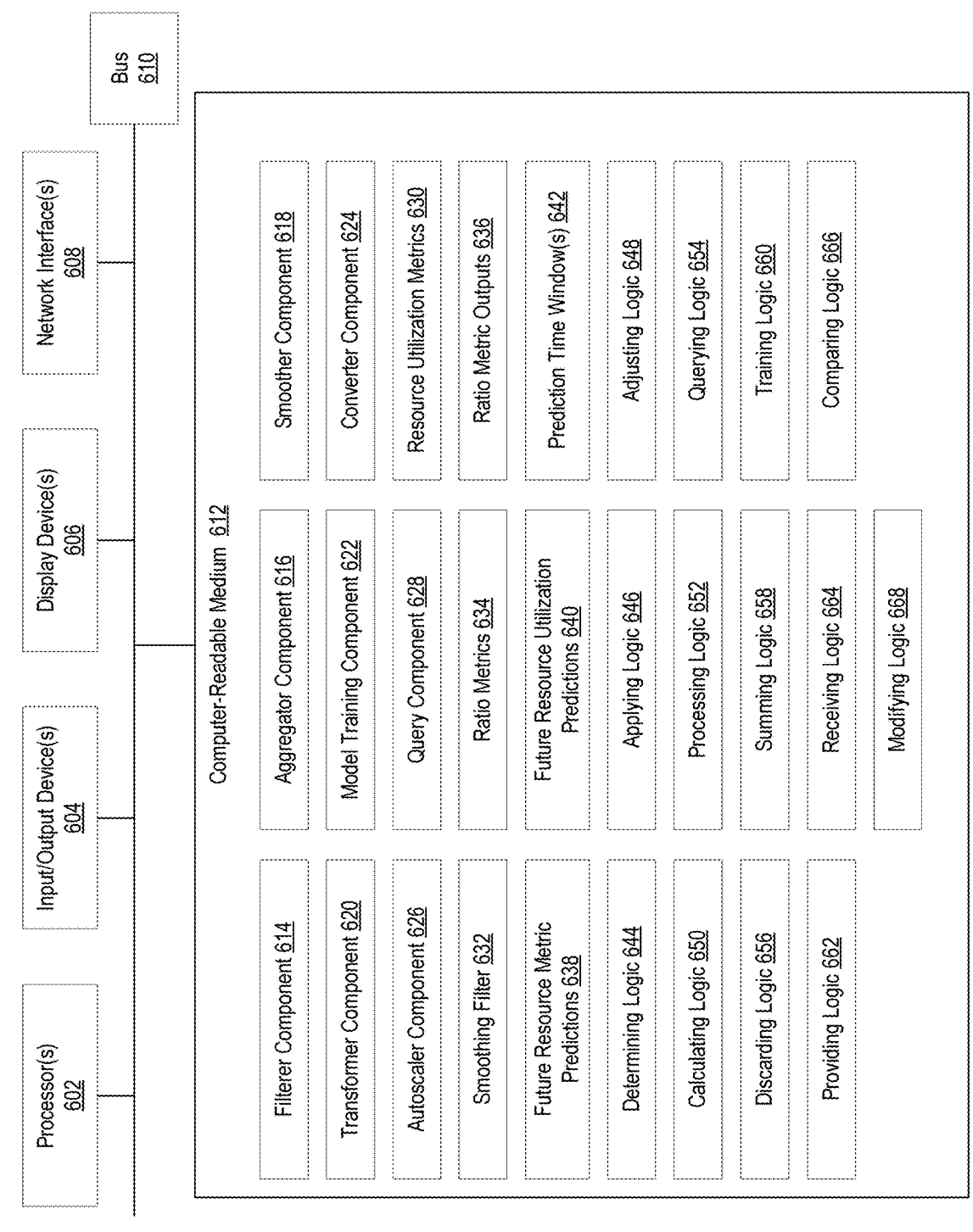
FIG. 6 depicts an example processing system with which aspects of the present disclosure can be performed.

In certain aspects, method 400, or any aspect related to it, may be performed by an apparatus or system, such as processing system 600 of FIG. 6, which includes various components operable, configured, or adapted to perform the method 400. Processing system 600 is described below in further detail.

Method 400 proactively helps to ensure that operational demands and/or performance requirements associated with the service are met, even as resource demand for the service changes over time. As such, performance bottleneck(s) and/or SLA violation(s) may be avoided, and user experience with the service may be improved. Further, method 400 beneficially provides a more accurate approach to predicting future resource utilization for a service such that the over-provisioning and/or under-provisioning of resources may be avoided.

Note that FIG. 4 is just one example of a method, and other methods including fewer, additional, or alternative operations are possible consistent with this disclosure.

Figure 5:
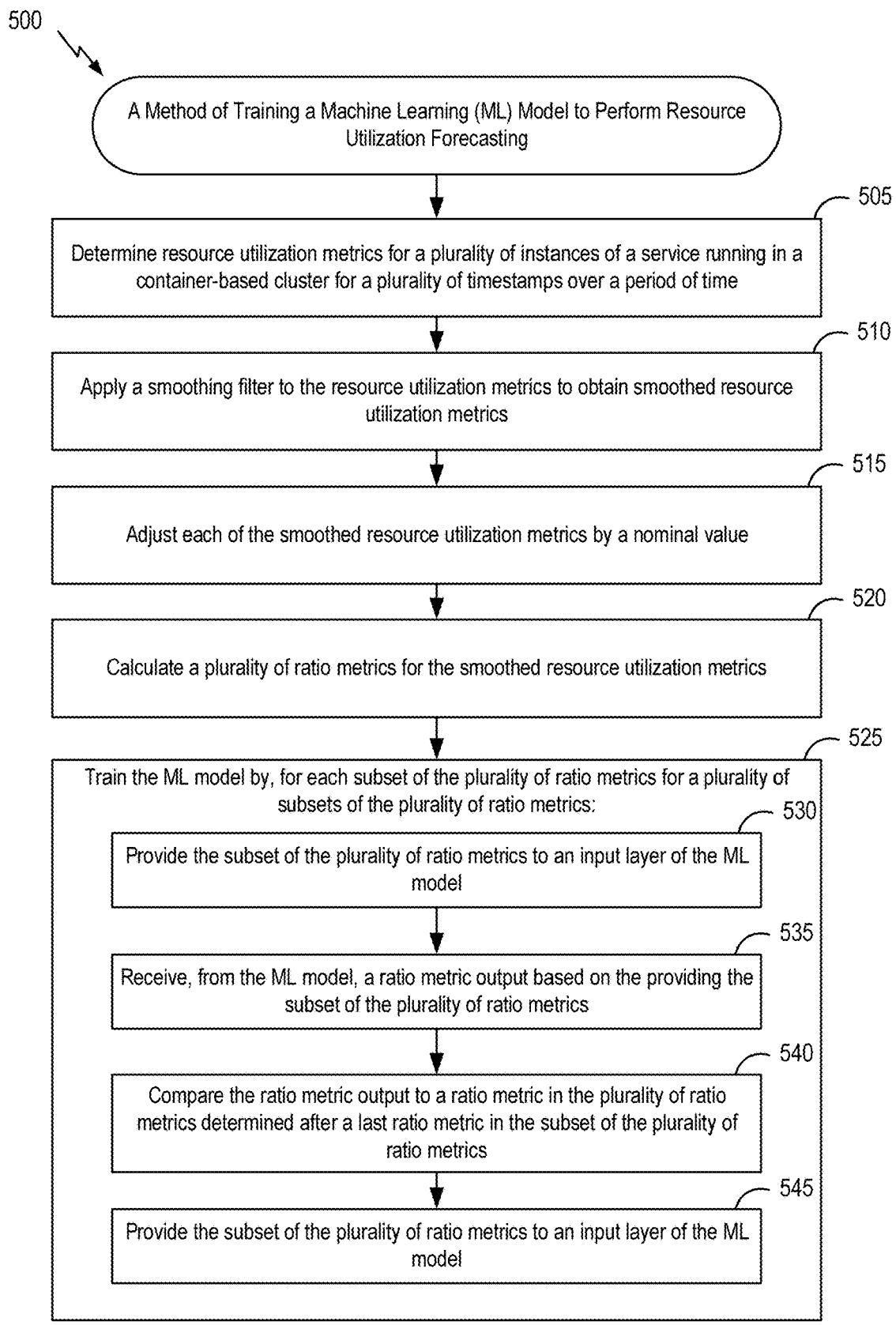
FIG. 5 depicts an example method of training a machine learning (ML) model to perform resource utilization forecasting.

Example Method for Training an ML Model to Perform Resource Utilization Forecasting FIG. 5 depicts an example method 500 for training an ML model to perform resource utilization forecasting. Method 500 may be performed by one or more processor(s) of a computing device, such as processor(s) 602 of processing system 600 described below with respect to FIG. 6.

Method 500 begins at block 505 with determining resource utilization metrics for a plurality of instances of a service running in a container-based cluster for a plurality of timestamps over a period of time.

Method 500 then proceeds to block 510 with applying a smoothing filter to the resource utilization metrics to obtain smoothed resource utilization metrics.

Method 500 then proceeds to block 515 with adjusting each of the smoothed resource utilization metrics by a nominal value.

Method 500 then proceeds to block 520 with calculating a plurality of ratio metrics for the smoothed resource utilization metrics. Each ratio metric may be calculated as a difference between a first smoothed resource utilization metric and a second smoothed resource utilization metric divided by the first smoothed resource utilization metric. The first smoothed resource utilization metric may be associated with a first timestamp. The second smoothed resource utilization metric may be associated with a second timestamp occurring later in time than the first timestamp. An absolute value difference between the first timestamp and the second timestamp may be equal to a prediction time window.

Method 500 then proceeds to block 525 with training the ML model by, for each subset of the plurality of ratio metrics for a plurality of subsets of the plurality of ratio metrics, performing operations associated with blocks 530-545.

Method 500 proceeds to block 530 with providing the subset of the plurality of ratio metrics to an input layer of the ML model.

Method 500 proceeds to block 535 with receiving, from the ML model, a ratio metric output based on the providing the subset of the plurality of ratio metrics.

Method 500 proceeds to block 540 with comparing the ratio metric output to a ratio metric in the plurality of ratio metrics determined after a last ratio metric in the subset of the plurality of ratio metrics.

Method 500 proceeds to block 545 with modifying one or more parameters of the ML model based on the comparison.

In certain aspects, block 505 includes: querying individual resource utilization metrics for each instance of the plurality of instances of the service for the plurality of timestamps over the period of time; for one or more of the plurality of instances: discarding one or more of the individual resource utilization metrics associated with the instance based on a state of the instance satisfying one or more conditions; and for each timestamp of the plurality of timestamps: summing the individual resource utilization metrics for each instance associated with the timestamp.

In certain aspects, the one or more conditions comprise the instance being in an unready state for serving traffic or the instance being in an error state.

In certain aspects, the smoothing filter comprises a Savitzky-Golay filter, a Wiener filter, or a Kalman filter.

In certain aspects, the resource utilization metrics comprise at least one of: memory usage; CPU usage; TPS; heap usage; or a busy thread percentage.

In certain aspects, method 500, or any aspect related to it, may be performed by an apparatus or system, such as processing system 600 of FIG. 6, which includes various components operable, configured, or adapted to perform the method 500. Processing system 600 is described below in further detail.

Method 500 beneficially provides techniques for more accurately training a model to predict future resource utilization for different services. For example, by processing and transforming utilization metrics into ratio metrics and using the ratio metrics instead of the resource utilization metrics to train the ML model, the ML model may be better suited to perform resource utilization forecasting.

Note that FIG. 5 is just one example of a method, and other methods including fewer, additional, or alternative operations are possible consistent with this disclosure.

Example Processing System for Predictive Autoscaling

FIG. 6 depicts an example processing system 600 configured to perform various aspects described herein, including, for example, method 400 as described above with respect to FIG. 4 and method 500 as described above with respect to FIG. 5.

Processing system 600 is generally be an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 600 includes one or more processors 602, one or more input/output devices 604, one or more display devices 606, one or more network interfaces 608 through which processing system 600 is connected to one or more networks (e.g., a local network, an intranet, the Internet, or any other group of processing systems communicatively connected to each other), and one or more memories and/or computer-readable mediums 612. In the depicted example, the aforementioned components are coupled by one or more buses 610, which may generally be configured for data exchange amongst the components. Bus(es) 610 may be representative of multiple buses, while only one is depicted for simplicity.

Processor(s) 602 are generally configured to retrieve and execute instructions stored in one or more memories, including local memory (ies)/computer-readable medium(s) 612, as well as remote memories and data stores. Similarly, processor(s) 602 are configured to store application data residing in local memory (ies)/computer-readable medium(s) 612, as well as remote memories and data stores. More generally, bus(es) 610 is configured to transmit programming instructions and application data among the processor(s) 602, display device(s) 606, network interface(s) 608, and/or memory (ies)/computer-readable medium(s) 612. In certain embodiments, processor(s) 602 are representative of a one or more central processing units (CPUs), graphics processing unit (GPUs), tensor processing unit (TPUs), accelerators, and other general or special purpose processing devices.

Input/output device(s) 604 may include any device, mechanism, system, interactive display, and/or various other hardware and software components for communicating information between processing system 600 and a user of processing system 600. For example, input/output device(s) 604 may include input hardware, such as a keyboard, touch screen, button, microphone, speaker, and/or other device for receiving inputs from the user and sending outputs to the user.

Display device(s) 606 may generally include any sort of device configured to display data, information, graphics, user interface elements, and the like to a user. For example, display device(s) 606 may include internal and external displays such as an internal display of a tablet computer or an external display for a server computer or a projector. Display device(s) 606 may further include displays for devices, such as augmented, virtual, and/or extended reality devices. In various embodiments, display device(s) 606 may be configured to display a graphical user interface.

Network interface(s) 608 provide processing system 600 with access to external networks and thereby to external processing systems. Network interface(s) 608 can generally be any hardware and/or software capable of transmitting and/or receiving data via a wired or wireless network connection. Accordingly, network interface(s) 608 can include a communication transceiver for sending and/or receiving any wired and/or wireless communication.

Memory (ies) computer-readable medium(s) 612 may include a volatile memory, such as a random access memory (RAM), or a nonvolatile memory, such as nonvolatile random access memory (NVRAM), or the like. In this example, memory (ies)/computer-readable medium(s) 612 includes filterer component 614, aggregator component 616, smoother component 618, transformer component 620, model training component 622, converter component 624, autoscaler component 626, query component 628, resource utilization metrics 630, smoothing filter 632, ratio metrics 634, ratio metric outputs 636, future resource metric predictions 638, future resource utilization predictions 640, prediction time window(s) 642, determining logic 644, applying logic 646, adjusting logic 648, calculating logic 650, processing logic 652, querying logic 654, discarding logic 656, summing logic 658, training logic 660, providing logic 662, receiving logic 664, comparing logic 666, and modifying logic 668.

In certain embodiments, determining logic 644 includes logic for determining resource utilization metrics for a plurality of instances of a service running in a container-based cluster for a plurality of timestamps over a period of time. In certain embodiments, determining logic 644 includes logic for determining a future resource utilization for the service after the prediction time window based on the future ratio metric.

In certain embodiments, applying logic 646 includes logic for applying a smoothing filter to the resource utilization metrics to obtain smoothed resource utilization metrics.

In certain embodiments, adjusting logic 648 includes logic for adjusting each of the smoothed resource utilization metrics by a nominal value. In certain embodiments, adjusting logic 648 includes logic for automatically adjusting one or more configuration parameters for the container-based cluster to modify a state of the container-based cluster based on the future resource utilization determined for the service. In certain embodiments, adjusting logic 648 includes logic for adjusting at least one of: a number of pods to be deployed in the container-based cluster; or a number of nodes to be deployed in the container-based cluster. In certain embodiments, adjusting logic 648 includes logic for automatically adjusting the one or more configuration parameters based on the future resource utilization being above or below a threshold.

In certain embodiments, calculating logic 650 includes logic for calculating a plurality of ratio metrics for the smoothed resource utilization metrics.

In certain embodiments, processing logic 652 includes logic for processing, with a machine learning (ML) model trained to perform resource utilization forecasting, the plurality of ratio metrics and to predict a future ratio metric for the service after the prediction time window.

In certain embodiments, querying logic 654 includes logic for querying individual resource utilization metrics for each instance of the plurality of instances of the service for the plurality of timestamps over the period of time.

In certain embodiments, discarding logic 656 includes logic for discarding one or more of the individual resource utilization metrics associated with the instance based on a state of the instance satisfying one or more conditions.

In certain embodiments, summing logic 658 includes logic for summing the individual resource utilization metrics for each instance associated with the timestamp to determine the resource utilization metric for the service at the timestamp.

In certain embodiments, training logic 660 includes logic for training an ML model to perform resource utilization forecasting.

In certain embodiments, providing logic 662 includes logic for providing the subset of the plurality of ratio metrics to an input layer of the ML model.

In certain embodiments, receiving logic 664 includes logic for receiving, from the ML model, a ratio metric output based on the providing the subset of the plurality of ratio metrics In certain embodiments, comparing logic 666 includes logic for comparing the ratio metric output to a ratio metric in the plurality of ratio metrics determined after a last ratio metric in the subset of the plurality of ratio metrics.

In certain embodiments, modifying logic 668 includes logic for modifying one or more parameters of the ML model based on the comparison.

Note that FIG. 6 is just one example of a processing system consistent with aspects described herein, and other processing systems having additional, alternative, or fewer components are possible consistent with this disclosure.

Example Clauses

Implementation examples are described in the following numbered clauses:

Clause 1: A method of autoscaling, comprising: determining resource utilization metrics for a plurality of instances of a service running in a container-based cluster for a plurality of timestamps over a period of time; applying a smoothing filter to the resource utilization metrics to obtain smoothed resource utilization metrics; adjusting each of the smoothed resource utilization metrics by a nominal value; calculating a plurality of ratio metrics for the smoothed resource utilization metrics, wherein: each ratio metric is calculated as a difference between a first smoothed resource utilization metric and a second smoothed resource utilization metric divided by the first smoothed resource utilization metric, the first smoothed resource utilization metric is associated with a first timestamp, the second smoothed resource utilization metric is associated with a second timestamp occurring later in time than the first timestamp, and an absolute value difference between the first timestamp and the second timestamp is equal to a prediction time window; processing, with a ML model trained to perform resource utilization forecasting, the plurality of ratio metrics and to predict a future ratio metric for the service after the prediction time window; determining a future resource utilization for the service after the prediction time window based on the future ratio metric; and automatically adjusting one or more configuration parameters for the container-based cluster to modify a state of the container-based cluster based on the future resource utilization determined for the service.

Clause 2: The method of Clause 1, wherein automatically adjusting the one or more configuration parameters for the container-based cluster comprises adjusting at least one of: a number of pods to be deployed in the container-based cluster; or a number of nodes to be deployed in the container-based cluster.

Clause 3: The method of any one of Clauses 1-2, wherein automatically adjusting the one or more configuration parameters for the container-based cluster to modify the state of the container-based cluster based on the future resource utilization determined for the service comprises automatically adjusting the one or more configuration parameters based on the future resource utilization being above or below a threshold.

Clause 4: The method of any one of Clauses 1-3, wherein determining the resource utilization metrics for the plurality of instances comprises: querying individual resource utilization metrics for each instance of the plurality of instances of the service for the plurality of timestamps over the period of time; for one or more of the plurality of instances: discarding one or more of the individual resource utilization metrics associated with the instance based on a state of the instance satisfying one or more conditions; and for each timestamp of the plurality of timestamps: summing the individual resource utilization metrics for each instance associated with the timestamp to determine the resource utilization metric for the service at the timestamp.

Clause 5: The method of Clause 4, wherein the one or more conditions comprise: the instance being in an unready state for serving traffic; or the instance being in an error state.

Clause 6: The method of any one of Clauses 1-5, wherein the smoothing filter comprises a Savitzky-Golay filter, a Wiener filter, or a Kalman filter.

Clause 7: The method of any one of Clauses 1-6, wherein the resource utilization metrics comprise at least one of: memory usage; CPU usage; TPS; heap usage; or a busy thread percentage.

Clause 8: The method of any one of Clauses 1-7, wherein: the container-based cluster comprises: a plurality of nodes; and a plurality of pods running on the plurality of nodes, and each pod comprises one or more containers running one or more of the plurality of instances.

Clause 9: A method of training a ML model to perform resource utilization forecasting, comprising: determining resource utilization metrics for a plurality of instances of a service running in a container-based cluster for a plurality of timestamps over a period of time; applying a smoothing filter to the resource utilization metrics to obtain smoothed resource utilization metrics; adjusting each of the smoothed resource utilization metrics by a nominal value; calculating a plurality of ratio metrics for the smoothed resource utilization metrics, wherein: each ratio metric is calculated as a difference between a first smoothed resource utilization metric and a second smoothed resource utilization metric divided by the first smoothed resource utilization metric, the first smoothed resource utilization metric is associated with a first timestamp, the second smoothed resource utilization metric is associated with a second timestamp occurring later in time than the first timestamp, and an absolute value difference between the first timestamp and the second timestamp is equal to a prediction time window; and training the ML model by, for each subset of the plurality of ratio metrics for a plurality of subsets of the plurality of ratio metrics: providing the subset of the plurality of ratio metrics to an input layer of the ML model; receiving, from the ML model, a ratio metric output based on the providing the subset of the plurality of ratio metrics; comparing the ratio metric output to a ratio metric in the plurality of ratio metrics determined after a last ratio metric in the subset of the plurality of ratio metrics; and modifying one or more parameters of the ML model based on the comparison.

Clause 10: The method of Clause 9, wherein determining the resource utilization metrics for the plurality of instances comprises: querying individual resource utilization metrics for each instance of the plurality of instances of the service for the plurality of timestamps over the period of time; for one or more of the plurality of instances: discarding one or more of the individual resource utilization metrics associated with the instance based on a state of the instance satisfying one or more conditions; and for each timestamp of the plurality of timestamps: summing the individual resource utilization metrics for each instance associated with the timestamp.

Clause 11: The method of Clause 10, wherein the one or more conditions comprise: the instance being in an unready state for serving traffic; or the instance being in an error state.

Clause 12: The method of any one of Clauses 9-11, wherein the smoothing filter comprises a Savitzky-Golay filter, a Wiener filter, or a Kalman filter.

Clause 13: The method of any one of Clauses 9-12, wherein the resource utilization metrics comprise at least one of: memory usage; CPU usage; TPS; heap usage; or a busy thread percentage.

Clause 14: A processing system, comprising: one or more memories comprising computer-executable instructions; and one or more processors configured to execute the computer-executable instructions and cause the processing system to perform a method in accordance with any one of Clauses 1-13.

Clause 15: A processing system, comprising means for performing a method in accordance with any one of Clauses 1-13.

Clause 16: A non-transitory computer-readable medium storing program code for causing a processing system to perform the steps of any one of Clauses 1-13.

Clause 17: A computer program product embodied on a computer-readable storage medium comprising code for performing a method in accordance with any one of Clauses 1-13.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of predictive autoscaling, comprising:
   determining resource utilization metrics for a plurality of instances of a service running in a container-based cluster for a plurality of timestamps over a period of time;
   applying a smoothing filter to the resource utilization metrics to obtain smoothed resource utilization metrics;
   adjusting each of the smoothed resource utilization metrics by a nominal value;
   calculating a plurality of ratio metrics for the smoothed resource utilization metrics, wherein:
      each ratio metric is calculated as a difference between a first smoothed resource utilization metric and a second smoothed resource utilization metric divided by the first smoothed resource utilization metric,
      the first smoothed resource utilization metric is associated with a first timestamp,
      the second smoothed resource utilization metric is associated with a second timestamp occurring later in time than the first timestamp, and
      an absolute value difference between the first timestamp and the second timestamp is equal to a prediction time window;
   processing, with a machine learning (ML) model trained to perform resource utilization forecasting, the plurality of ratio metrics and to predict a future ratio metric for the service after the prediction time window;
   determining a future resource utilization for the service after the prediction time window based on the future ratio metric; and
   automatically adjusting one or more configuration parameters for the container-based cluster to modify a state of the container-based cluster based on the future resource utilization determined for the service.

2. The method of claim 1, wherein automatically adjusting the one or more configuration parameters for the container-based cluster comprises adjusting at least one of:
   a number of pods to be deployed in the container-based cluster; or
   a number of nodes to be deployed in the container-based cluster.

3. The method of claim 1, wherein automatically adjusting the one or more configuration parameters for the container-based cluster to modify the state of the container-based cluster based on the future resource utilization determined for the service comprises automatically adjusting the one or more configuration parameters based on the future resource utilization being above or below a threshold.

4. The method of claim 1, wherein determining the resource utilization metrics for the plurality of instances comprises:
querying individual resource utilization metrics for each instance of the plurality of instances of the service for the plurality of timestamps over the period of time;
for one or more of the plurality of instances:
discarding one or more of the individual resource utilization metrics associated with the instance based on a state of the instance satisfying one or more conditions; and
for each timestamp of the plurality of timestamps:
summing the individual resource utilization metrics for each instance associated with the timestamp to determine the resource utilization metric for the service at the timestamp.

5. The method of claim 4, wherein the one or more conditions comprise:
the instance being in an unready state for serving traffic; or
the instance being in an error state.

6. The method of claim 1, wherein the smoothing filter comprises:
a Savitzky-Golay filter;
a Wiener filter; or
a Kalman filter.

7. The method of claim 1, wherein the resource utilization metrics comprise at least one of:
memory usage;
central processing unit (CPU) usage;
transactions per second (TPS);
heap usage; or
a busy thread percentage.

8. The method of claim 1, wherein:
the container-based cluster comprises:
a plurality of nodes; and
a plurality of pods running on the plurality of nodes, and
each pod comprises one or more containers running one or more of the plurality of instances.

9. A method of training a machine learning (ML) model to perform resource utilization forecasting, comprising:
determining resource utilization metrics for a plurality of instances of a service running in a container-based cluster for a plurality of timestamps over a period of time;
applying a smoothing filter to the resource utilization metrics to obtain smoothed resource utilization metrics;
adjusting each of the smoothed resource utilization metrics by a nominal value;
calculating a plurality of ratio metrics for the smoothed resource utilization metrics, wherein:
each ratio metric is calculated as a difference between a first smoothed resource utilization metric and a second smoothed resource utilization metric divided by the first smoothed resource utilization metric,
the first smoothed resource utilization metric is associated with a first timestamp,
the second smoothed resource utilization metric is associated with a second timestamp occurring later in time than the first timestamp, and
an absolute value difference between the first timestamp and the second timestamp is equal to a prediction time window;
training the ML model by, for each subset of the plurality of ratio metrics for a plurality of subsets of the plurality of ratio metrics:
providing the subset of the plurality of ratio metrics to an input layer of the ML model;
receiving, from the ML model, a ratio metric output based on the providing the subset of the plurality of ratio metrics;
comparing the ratio metric output to a ratio metric in the plurality of ratio metrics determined after a last ratio metric in the subset of the plurality of ratio metrics; and
modifying one or more parameters of the ML model based on the comparison.

10. The method of claim 9, wherein determining the resource utilization metrics for the plurality of instances comprises:
querying individual resource utilization metrics for each instance of the plurality of instances of the service for the plurality of timestamps over the period of time;
for one or more of the plurality of instances:
discarding one or more of the individual resource utilization metrics associated with the instance based on a state of the instance satisfying one or more conditions; and
for each timestamp of the plurality of timestamps:
summing the individual resource utilization metrics for each instance associated with the timestamp.

11. The method of claim 10, wherein the one or more conditions comprise:
the instance being in an unready state for serving traffic; or
the instance being in an error state.

12. The method of claim 9, wherein the smoothing filter comprises:
a Savitzky-Golay filter;
a Wiener filter; or
a Kalman filter.

13. The method of claim 9, wherein the resource utilization metrics comprise at least one of:
memory usage;
central processing unit (CPU) usage;
transactions per second (TPS);
heap usage; or
a busy thread percentage.

14. A processing system, comprising:
one or more memories comprising computer-executable instructions; and
one or more processors configured to execute the computer-executable instructions and cause the processing system to:
determine resource utilization metrics for a plurality of instances of a service running in a container-based cluster for a plurality of timestamps over a period of time;
apply a smoothing filter to the resource utilization metrics to obtain smoothed resource utilization metrics;
adjust each of the smoothed resource utilization metrics by a nominal value;

calculate a plurality of ratio metrics for the smoothed resource utilization metrics, wherein:
  each ratio metric is calculated as a difference between a first smoothed resource utilization metric and a second smoothed resource utilization metric divided by the first smoothed resource utilization metric,
  the first smoothed resource utilization metric is associated with a first timestamp,
  the second smoothed resource utilization metric is associated with a second timestamp occurring later in time than the first timestamp, and
  an absolute value difference between the first timestamp and the second timestamp is equal to a prediction time window;
process, with a machine learning (ML) model trained to perform resource utilization forecasting, the plurality of ratio metrics and to predict a future ratio metric for the service after the prediction time window;
determine a future resource utilization for the service after the prediction time window based on the future ratio metric; and
automatically adjust one or more configuration parameters for the container-based cluster to modify a state of the container-based cluster based on the future resource utilization determined for the service.

15. The processing system of claim 14, wherein to automatically adjust the one or more configuration parameters for the container-based cluster, the one or more processors are configured to execute the computer-executable instructions and cause the processing system to adjust at least one of:
  a number of pods to be deployed in the container-based cluster; or
  a number of nodes to be deployed in the container-based cluster.

16. The processing system of claim 14, wherein to automatically adjust the one or more configuration parameters for the container-based cluster, the one or more processors are configured to execute the computer-executable instructions and cause the processing system to automatically adjusting the one or more configuration parameters based on the future resource utilization being above or below a threshold.

17. The processing system of claim 14, wherein to determine the resource utilization metrics for the plurality of instances, the one or more processors are configured to execute the computer-executable instructions and cause the processing system to:
  query individual resource utilization metrics for each instance of the plurality of instances of the service for the plurality of timestamps over the period of time;
  for one or more of the plurality of instances:
    discard one or more of the individual resource utilization metrics associated with the instance based on a state of the instance satisfying one or more conditions; and
  for each timestamp of the plurality of timestamps:
    sum the individual resource utilization metrics for each instance associated with the timestamp to determine the resource utilization metric for the service at the timestamp.

18. The processing system of claim 17, wherein the one or more conditions comprise:
  the instance being in an unready state for serving traffic; or
  the instance being in an error state.

19. The processing system of claim 14, wherein the smoothing filter comprises:
  a Savitzky-Golay filter;
  a Wiener filter; or
  a Kalman filter.

20. The processing system of claim 14, wherein the resource utilization metrics comprise at least one of:
  memory usage;
  central processing unit (CPU) usage;
  transactions per second (TPS);
  heap usage; or
  a busy thread percentage.

* * * * *